United States Patent
Raman et al.

(10) Patent No.: US 11,093,506 B1
(45) Date of Patent: Aug. 17, 2021

(54) COMBINING DATA STREAMS GENERATED BY INSTRUMENTED SOFTWARE USING METADATA CORRELATION

(71) Applicant: Splunk Inc., San Francisco, CA (US)

(72) Inventors: Rajesh Raman, Palo Alto, CA (US); Maxime Petazzoni, San Mateo, CA (US); Arijit Mukherji, Fremont, CA (US); Phillip Liu, Palo Alto, CA (US)

(73) Assignee: Splunk Inc., San Francisco, CA (US)

( * ) Notice: Subject to any disclaimer, the term of this patent is extended or adjusted under 35 U.S.C. 154(b) by 241 days.

(21) Appl. No.: 16/427,024

(22) Filed: May 30, 2019

Related U.S. Application Data

(60) Provisional application No. 62/679,629, filed on Jun. 1, 2018.

(51) Int. Cl.
| | |
|---|---|
| *G06F 16/24* | (2019.01) |
| *G06F 16/2455* | (2019.01) |
| *G06F 16/242* | (2019.01) |
| *G06F 16/2453* | (2019.01) |
| *G06F 16/907* | (2019.01) |
| *G06F 16/28* | (2019.01) |
| *G06F 40/205* | (2020.01) |
| *G06F 40/279* | (2020.01) |

(52) U.S. Cl.
CPC ...... *G06F 16/24568* (2019.01); *G06F 16/244* (2019.01); *G06F 16/24535* (2019.01); *G06F 16/284* (2019.01); *G06F 16/907* (2019.01); *G06F 40/205* (2020.01); *G06F 40/279* (2020.01)

(58) Field of Classification Search
CPC . G06F 16/24568; G06F 16/907; G06F 16/284
See application file for complete search history.

(56) References Cited

U.S. PATENT DOCUMENTS

| | | | |
|---|---|---|---|
| 9,892,020 B1* | 2/2018 | Ophir | G06F 16/24568 |
| 2016/0179588 A1* | 6/2016 | Raman | G06F 11/3452 |
| | | | 719/318 |

* cited by examiner

*Primary Examiner* — Loc Tran
(74) *Attorney, Agent, or Firm* — McDermott Will & Emery LLP

(57) ABSTRACT

A system processes data stream language expressions that combine result data streams from multiple data stream language sub-expressions. The system determines a set of fixed dimensions based on static analysis of the data stream language sub-expression. The system determines a union set representing a union of the sets of fixed dimensions. The system determines at execution time of the data stream language expression, a plurality of sets of data streams. Each set of data stream corresponds to a data stream language sub-expression from the plurality of data stream language expressions. The system correlates data streams across the plurality of sets of data streams based on the union set. The system determines result data streams for the data stream language expression by combining data values of correlated data streams.

17 Claims, 12 Drawing Sheets

COMBINING DATA STREAMS GENERATED BY INSTRUMENTED SOFTWARE USING METADATA CORRELATION

CROSS REFERENCE TO RELATED APPLICATION

This application claims the benefit of U.S. Provisional Application No. 62/679,629 filed on Jun. 1, 2018, which is herein incorporated by reference in its entirety.

BACKGROUND

This disclosure relates to processing of data streams using data stream language programs in general and more specifically to combining data streams received from instrumented software using metadata correlation.

Systems monitor different aspects of execution of processes by using instrumented software. These aspects include performance of runtime execution, errors encountered during execution, significant events encountered during execution of the software, information describing which instructions are being executed and which instructions are not being executed, and so on. Conventional techniques for instrumenting code include statements in the code that log different types of information to log files or print information on screens. This technique is suitable for simple applications, for example, applications having a simple flow of execution that execute on a single processor. However, these techniques for instrumenting software are inadequate for complex applications that may be distributed across multiple systems, each system executing multiple processes or threads of execution.

Conventional techniques for instrumenting code cause significant delays in assimilating the information, storing the information, and analyzing the information to generate reports. As a result, there can be significant delay between the time that a problem occurs in the systems and the time that the problem is detected. Accordingly, conventional systems for generating reports based on instrumentation of software are often inadequate in fast paced development cycles of complex applications.

SUMMARY

A system receives a data stream language expression. The data stream language expression is configured to combine result data streams from a plurality of data stream language sub-expressions. For each of the plurality of data stream language sub-expressions, the system determines a set of fixed dimensions based on static analysis of the data stream language sub-expression. The set of fixed dimensions represent keys for uniquely identifying data streams obtained by processing the data stream language sub-expression. The system determines a union set representing a union of the sets of fixed dimensions corresponding to the plurality of data stream language sub-expressions. The system determines at execution time of the data stream language expression, a plurality of sets of data streams. Each set of data stream corresponds to a data stream language sub-expression from the plurality of data stream language expressions. The system correlates data streams across the plurality of sets of data streams based on the union set. The system determines one or more result data streams for the data stream language expression. Each data value of a result data stream is obtained by combining data values of correlated data streams from the plurality of sets of data streams.

The system may send the result data streams for displaying on a user interface. The system may generate alerts based on the result data streams and send the alerts to users, for example, operators or system administrators who can take action based on the alerts.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
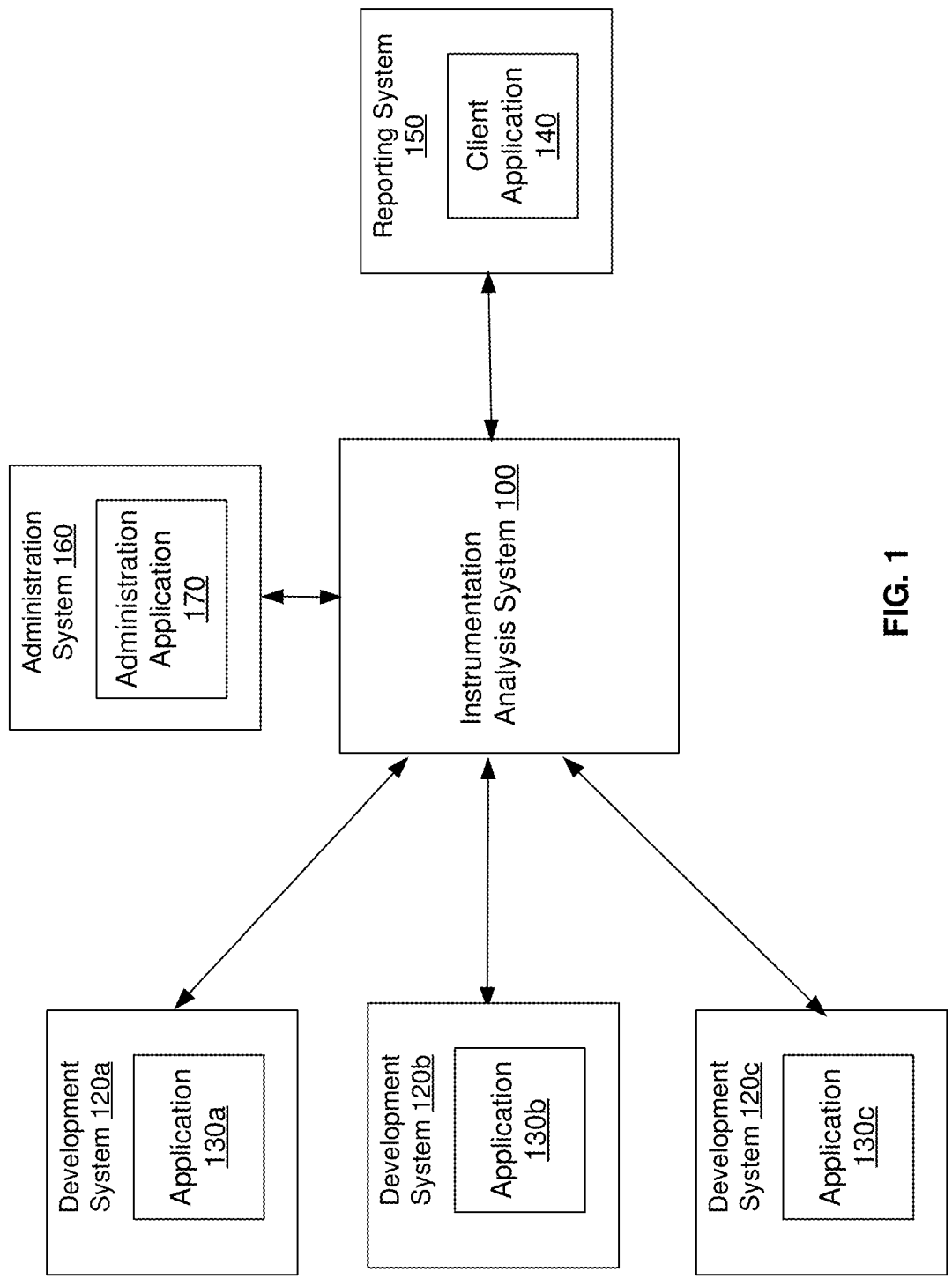
FIG. 1 shows the overall system environment for reporting based on instrumented software, according to an embodiment.

FIG. 1 shows the overall system environment for reporting based on instrumented software, according to an embodiment. The overall system environment includes an instrumentation analysis system 100, one or more development systems 120, an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The instrumentation analysis system 100 receives data comprising values of metrics sent by different development systems 120 (the instrumentation analysis system 100 may also be referred to herein as an analysis system or a data analysis system). A development system 120 executes instrumented software, for example, application 130. Although, application 130 is shown in FIG. 1 as an example of instrumented software, the techniques disclosed herein are not limited to application software but are applicable to other kinds of software, for example, server software, software executing on client devices, websites, and so on. Furthermore, a development system 120 comprises any computing system that is configured to execute instrumented software, whether or not it is used for development of new software. For example, the development system 120 may be a computing system used for testing purposes, staging purposes, or any production system executing in an enterprise.

The software executing on a development system 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. The application 130 sends data to the instrumentation analysis system 100 by invoking application programming interface (API) supported by the instrumentation analysis system 100.

A software program may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on.

Typically a counter value changes monotonically, for example, a counter value may increase (or decrease) monotonically. For example, if the counter tracks the number of times an event has occurred since the system started execution, the counter value increases each time the occurrence of the event is detected by the system. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1",
      metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. Embodiments allow the application 130 to be instrumented so as to reduce the amount of information sent with each data stream. This reduces the amount of overhead introduced in the application 130 as a result of instrumenting the code.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

Systems and methods for analyzing data streams based on instrumentation of software are described in the U.S. Pat. No. 9,804,951, issued on Oct. 31, 2017 and U.S. Pat. No. 9,804,830, issued on Oct. 31, 2017, each of which is incorporated by reference hereby in its entirety.

The instrumentation analysis system 100 can receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

Associating Dimensions with Data Streams

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in the metadata store 230. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name.) For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on.

As another example of a dimension, a system may define customer name as a dimension. The name of the customer may be reported by the instrumented software, for example, based on the configuration parameters of the instrumented software executing on a development system 120. The customer name may be specified for the instrumented software using a system property. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on.

A data stream may be obtained from instrumented software or may be generated as a result of execution of blocks of a data stream language program within the instrumentation analysis system. A data stream may also comprise data stored in the instrumentation analysis system, for example, in a data store (such as a time series data store 260 described herein.)

System Architecture of the Instrumentation Analysis System

Figure 2:
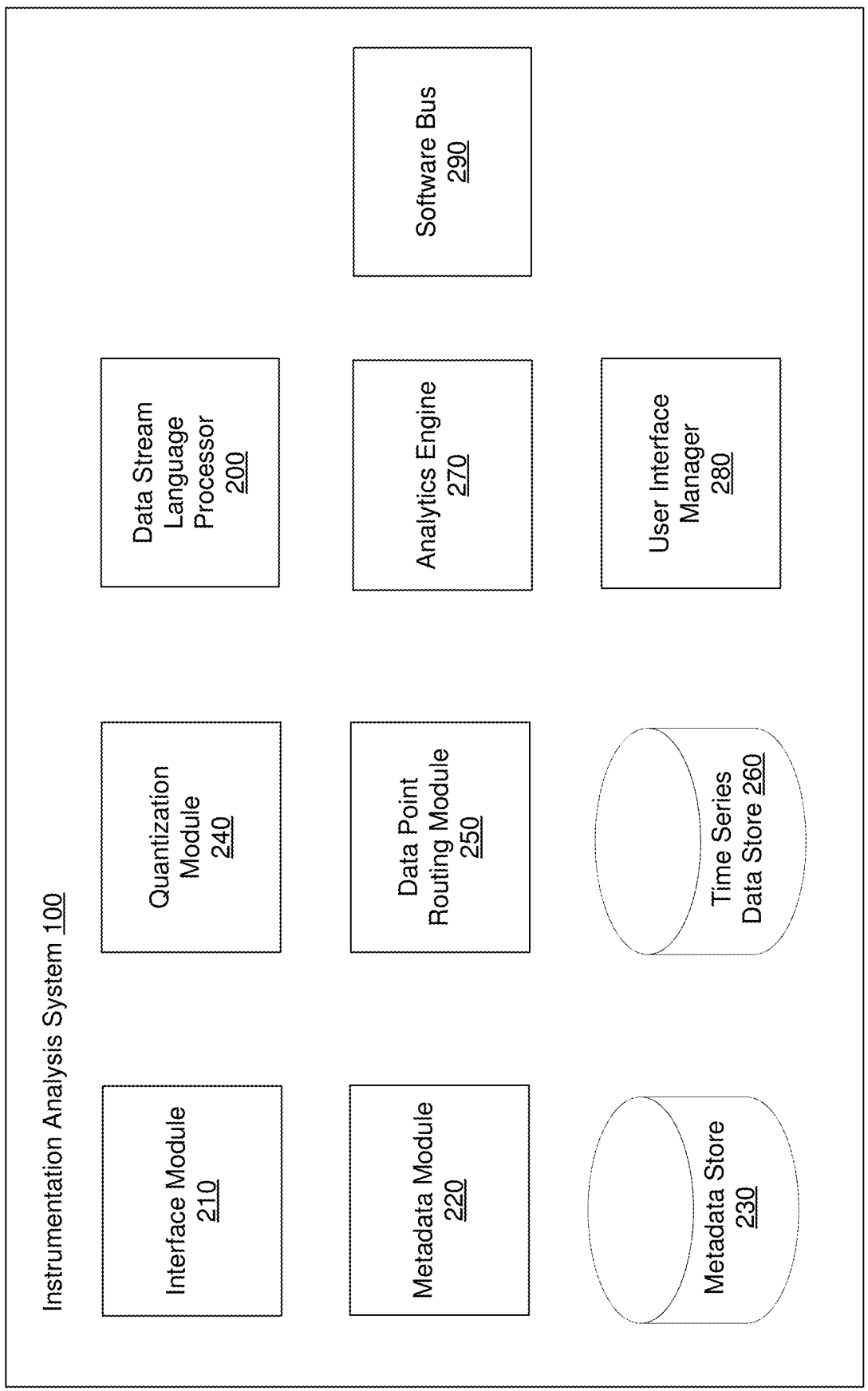
FIG. 2 shows the architecture of a system for executing a data stream language program for processing data streams received from instrumented software, according to an embodiment.

FIG. 2 shows the architecture of a system for executing a data stream language program for processing data streams received from instrumented software, according to an embodiment. The instrumentation analysis system 100 includes an interface module 210, a quantization module 240, metadata module 220, metadata store 230, a data point routing module 250, an analytics engine 270, a user interface manager 280, a data stream language processor 200, a time series data store 260, and software bus 290. In other embodiments, the instrumentation analysis system 100 may include other modules not described herein. Functionality indicated as provided by a particular module may be implemented by other modules instead.

The interface module 210 receives requests from external systems, for example, development systems 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams from one or more development systems 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data.

In an embodiment, the timestamp associated with a tuple represents the time that the data value was received by the instrumentation analysis system 100. The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 100.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval. Systems and methods for quantization of data streams of instrumented software are described in the U.S. patent application Ser. No. 14/800,679, filed on Jul. 15, 2015 which is incorporated by reference hereby in its entirety.

The metadata module 220 receives and stores metadata information describing various data streams received from the development systems 120. In an embodiment, the metadata stored in the metadata module 220 is received from a user, for example, a system administrator interacting with the instrumentation analysis system 100 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata store 230 may receive instructions to modify a metadata object. For example, the metadata store 230 may receive instructions to modify, add or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The user interface manager 280 renders the user interface for allowing users to specify the parameters of a data stream language program and to present results of execution of the data stream language program. The user interface manager 280 may display real-time results of a data stream language program as one or more charts that are periodically updated as the data of the data streams is received. The user interface manager 280 also presents a user interface that allows users to specify a data stream language program visually rather than textually. Examples of screenshots of user interfaces presented by the user interface manager 280 are described herein.

The time series data store 260 stores data received from various sources, for example, development systems 120. The time series data store 260 is also referred to herein as time series database (or TSDB.) In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 100 to provide data of data streams to other modules of the instrumentation analysis system 100. A data stream language program may send a data stream to the software bus 290. Other modules, for example, fetch module 320, find module 310, and so on can read the data from the software bus 290 and perform further processing on the data. For example, a data stream output of a data stream language program published on the software bus 290 may be identified by a find block of another data stream language program executing as a job.

The data stream language processor 200 executes programs specified using the data stream language. The data stream language processor 200 receives a data stream language program, parses the data stream language program to validate the program. The data stream language processor 200 generates a representation of the data stream language program and executes the data stream language program using the representation.

The requests specified using the data stream language is a query based on the metadata associated with data received from various development systems 120. The data stream language supports various types of analytic functions, for example, aggregations and transformations. The data stream language provides the ability to compose various functions including aggregations and transformations in various ways. In an embodiment, the data stream language processor 200 parses programs specified using the data stream language, generates an executable representation of the program, and executes the generated representation.

Data Stream Language

According to an embodiment, a program specified using the data stream language comprises units of computation called blocks. Each block is associated with a particular processing or computation performed by the data block. Each block may also have one or more input ports and one or more output ports. A block receives input via an input port, performs certain computation using the data and sends the result of the computation to the output port. This process is repeated at a pre-specified periodicity. Accordingly, an input port acts as a mechanism to provide data to the block and an output port acts as a mechanism to output data of the block.

In an embodiment, each block is associated with a type of the block. The type of the block determines the computation performed by the block. The types of blocks supported by the data stream language include a find block, a fetch block, a statistical computation block, a threshold block, and so on. A block may be associated with certain configuration parameters. For example, a find block may take an expression as input. A data stream language program includes instances of a type of block. For example, a find block with a particular search expression is an instance of the find block that is included in a data stream language program.

In an embodiment, an input port of a block is identified with character "T" and an output port is identified with character "!". Other embodiments may identify the input/output ports using other syntax. For example, if a block B1 has input ports in1 and in2, a specific input port (say in2) may be identified as "B1?in2". Similarly, if block B1 has output ports out1 and out2, a specific output port (say out2) can be specified as "B2!out2". If a block has a single input/output port, the data stream language program may not identify the port. For example, if block B2 has a single input port, the input port may be referred to as "B2". Similarly, if block B2 has a single output port, the output port may be referred to as "B2".

Two blocks may be connected by specifying that the output of one block is provided as input of the other block. Accordingly, a data stream language program can be considered a network of blocks. In an embodiment, the connection between two blocks is specified using an arrow between the two blocks. For example, if B1 and B2 both have a single input port and a single input port, "B1->B2" specifies that the output of B1 is provided as input of block B2. Similarly, if B1 has two output ports out1 and out2 and B2 has two input ports i1 and in2, the out1 port of B1 may be connected to the in2 port of B2 by the expression "B1!out1->B2?in2".

The data stream language processor 200 may execute multiple jobs based on a data stream language program. Each job may be associated with a start time, an end time, and a periodicity. Accordingly, the job is executed from the start time until the end time at intervals specified by the periodicity. The periodicity specifies the rate at which data is processed by the data stream language program. A user may specify different jobs for execution based on the same data stream language program, each job associated with different start time, end time, and periodicity.

Figure 3:
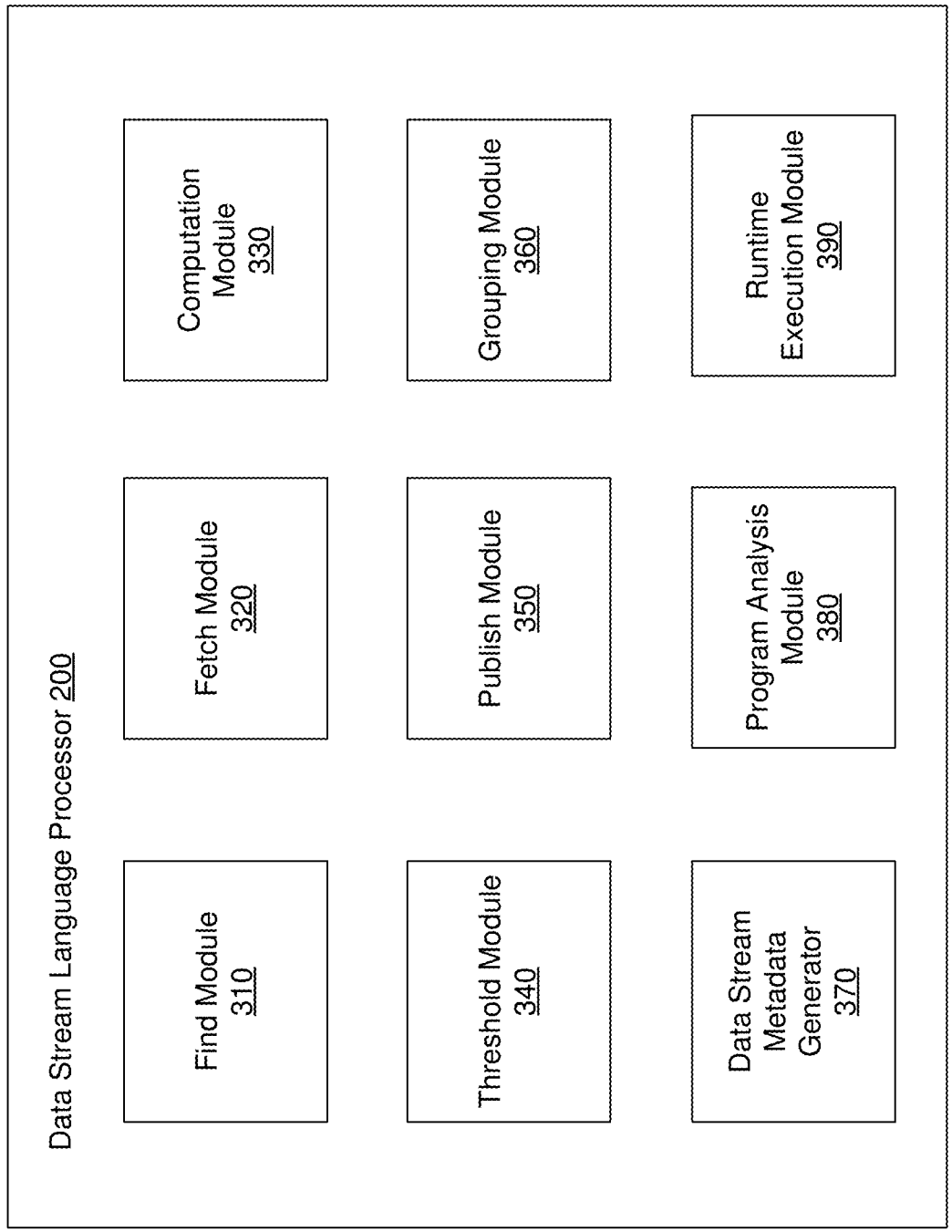
FIG. 3 shows the architecture the data stream language processor for processing blocks of data stream language programs, according to an embodiment.

FIG. 3 shows the architecture the data stream language processor for processing blocks of data stream language programs, according to an embodiment. As shown in FIG. 3, the data stream language processor 200 includes modules for processing various types of blocks of the data stream language. Accordingly, the data stream language processor 200 includes a find module 310, a fetch module 320, a computation module 330, a threshold module 340, a publish module 350, a grouping module 360, a data stream metadata generator 370, a program analysis module 380, and a runtime execution module 390. Other embodiments may include more or less modules than those shown in FIG. 3. Certain modules are not illustrated in FIG. 3, for example, a parser. The details of each module are further described herein along with details of the types of blocks processed by each module.

The find module 310 executes the find block to identify a set of data streams for processing by the rest of the data stream language program. The fetch module 320 fetches data from the identified data streams and provides the data for processing by subsequent blocks of the data stream language program. The computation module 330 performs statistical computations specified in the data stream language program, for example, mean, median, sum, and so on. The threshold module 340 compares data of an incoming data stream with a threshold value to determine if the incoming data exceeds certain bounds. The threshold value specified for comparison may dynamically change, for example, a threshold value may be specified as a one hour moving average of the input data stream scaled by certain factor. The publish module 350 executes the publish block that provides the output of the blocks preceding the publish block to various receivers including a user interface (e.g., a dashboard) for presenting the results, for storing in a database, or for providing to other blocks for further processing. The grouping module 360 performs grouping of data of input data streams to generate a set of result data streams corresponding to each group. The groups may be based on one or more attributes specified with the grouping command, for example, groups of data streams from each data center. The data stream metadata generator 370 generates metadata representing result data streams generated as a result of executing data stream language programs and stores the metadata in the metadata store 230 for allowing other components of the instrumentation analysis system 100 to use the result data stream. The program analysis module 380, analyzes a data stream language program to extract information that is useful for correlating sets of data streams. The program analysis module 380 performs static analysis of the data stream language program that can be performed without executing the data stream language program. For example, the program analysis module 380 statically determines a union of sets of fixed dimensions for an expression that composes a plurality of sub-expressions, as described in FIG. 7. The runtime execution module 390 executes a data stream language program by continuously receiving data from several input data streams and periodically executing the data stream language program to generate a result data stream. The runtime execution module 390 uses information provided by the program analysis module 380 by performing on static analysis of the data stream language program for efficient and correct execution of the data stream language program.

Example Data Stream Language Program

Figure 4:
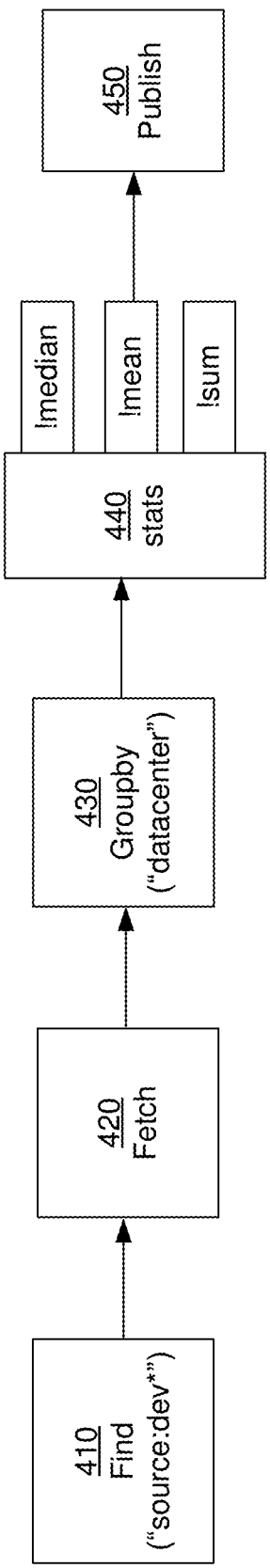
FIG. 4 shows an example of a data stream language program for illustrating features of the data stream language, according to an embodiment.

FIG. 4 shows an example of a data stream language program for illustrating features of the data stream language, according to an embodiment. FIG. 4 represents the data stream language program in terms of blocks. The data stream language program shown in FIG. 4 can be specified as follows.

find("source:analytics*")→fetch
 →groupby("datacenter")
 →stats!mean
 →publish

The first block of the above data stream language program is a find block 410 that takes a string parameter that specifies a search expression. The find block finds a set of data streams received by the instrumentation analysis system 100 that satisfy the search expression. For example, the find block 410 takes search expression "source:dev" that identifies all data stream that the "source" metadata attribute value "dev." For example, an enterprise may associated all development systems with source value "dev." The output of the find block is provides as input to a fetch block 420.

The fetch block 420 retrieves data from the data streams identified by the find block. The fetch block receives data at a pre-specified periodicity. The fetch block may receive real time data of data streams received by the interface module 210 and quantized by the quantization module 240. The fetch block 420 may also receive data of data streams stored in the time series data store 260. The output of the fetch block 420 is provided as input to the groupby block 430.

The groupby block 430 takes names of one or more attributes of data streams as input. The groupby block 430 groups the data streams by the specified attributes. As shown in the example above, the groupby block 430 takes a "datacenter" attribute as input and groups the data streams by their datacenter value. Accordingly, data of all data streams having the same data center is grouped together. The groupby block 430 outputs a data stream corresponding to each value of data center. The output of the groupby block 430 is provided as input to the stats block 440 (which is a type of statistical computation block).

The stats block 440 has multiple outputs, for example, mean, median, sum, and so on. Each output port provides values based on the type of computation specified by the name of the output. The stats block 440 computes the mean value for each group of data streams received as input from the groupby block 430. Accordingly, the stats block 440 determines the mean of data received from data streams of each datacenter. As shown in FIG. 4, the mean output port of the stats block provides input to the publish block 450.

The publish block 450 may be configured to publish the received input on a dashboard. The publish block may be configured to publish the data on the software bus 290. The software bus 290 provides the data to all other modules of the instrumentation analysis system 100. The data stream language processor 200 executes the various blocks specified above at a periodicity specified for the data stream language program.

Overall Process of Execution of a Data Stream Language Program

Figure 5:
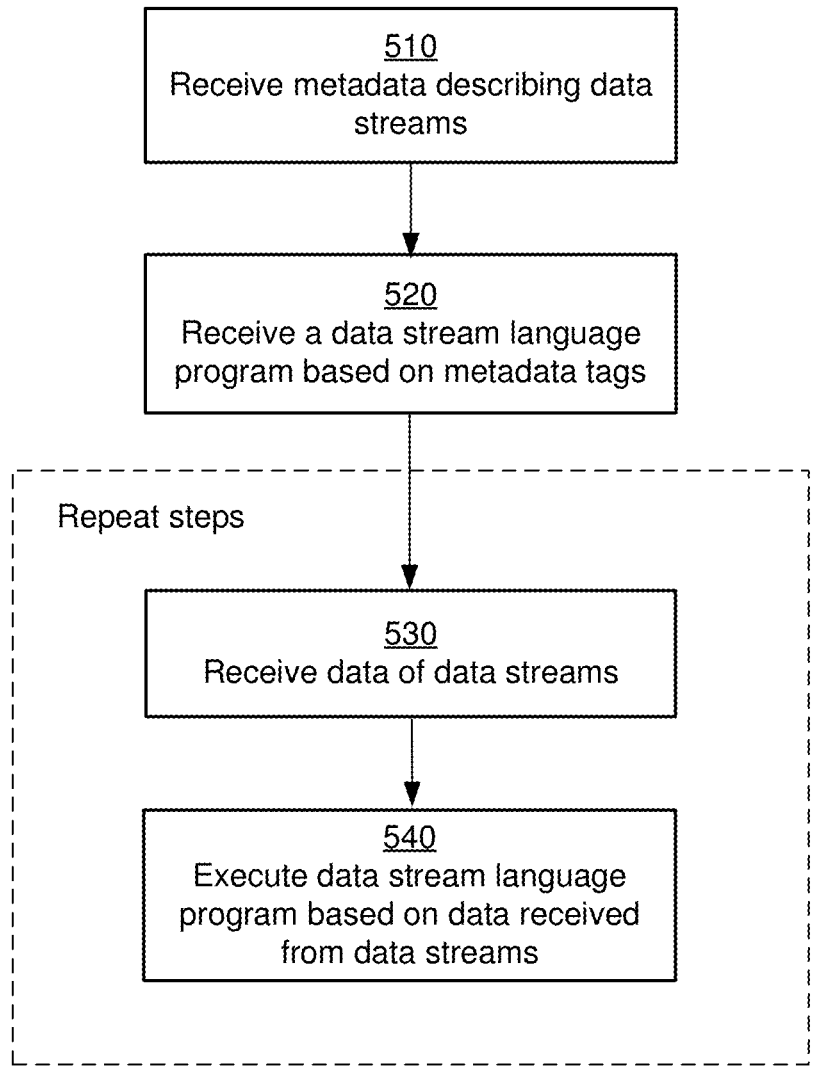
FIG. 5 shows the overall process of an instrumentation analysis system for processing data received from data streams based on a data stream language program, according to an embodiment.

FIG. 5 shows the overall process of an instrumentation analysis system for processing data received from data streams based on a data stream language program, according to an embodiment. The metadata module 220 receives 510 metadata describing data streams. The metadata definition is received independent of the data of the data streams themselves. For example, the data stream may simply provide tuples comprising a data value and a timestamp associated with the data value without providing any properties (for example, name-value pairs.) The metadata module 220 receives the properties describing the data streams from a source different from the source providing the data stream. For example, the data streams are provided by instances of instrumented software that is executing on development system 120, whereas the metadata definition may be provided by a system administrator via the administration system 160.

The analytics engine 270 receives 520 a data stream language program using the metadata attributes describing data streams. The data stream language program may represent a set of instructions provided to the instrumentation analysis system 100 to generate reports describing the instrumented software and provide the results in real-time, i.e., as the data of the data streams is received.

The instrumentation analysis system 100 repeats the following steps as data of various data streams is received by the instrumentation analysis system 100 from various development systems 120. The interface module 210 receives 530 data of different data streams. In an embodiment, the interface module 210 waits for a fixed interval of time, for example, 1 second or a few seconds and collects data received from different data streams. In an embodiment, the quantization module 240 performs quantization of the data for each incoming data stream for each time interval. Accordingly, data from each data stream is aggregated into a single value associated with the data stream for that time interval.

The analytics engine 270 executes 540 the data stream language program based on the data of the data streams for the time interval. If the data is quantized for each data stream, the analytics engine 270 executes 540 the data stream language program using the quantized values from each data stream. The data stream language program may include a publish block that causes the analytics engine 270 to send the result(s) of evaluation of the data stream language program for presentation, for example, to a user interface.

The data stream language program may generate one or more data streams. The analytics engine 270 also stores the data streams generated as a result of evaluation of the data stream language program, for example, in the time series data store 260. The analytics engine 270 creates one or more new data streams (or time series) representing the results of the data stream language program. The new data streams are stored in the time series data store 260. This allows the result of the data stream language program to be used as input to other data stream language program. For example, a data stream language program may generate data representing the 95$^{th}$ percentile of values received from a plurality of data streams. The result of the data stream language program may be stored in the time series data store 260 as a new data stream. The analytics engine 270 may further execute another data stream language program that computes a moving average value based on the generated data stream.

Quantization

The quantization of the input data streams simplifies processing of data using the quantized data streams. For example, aggregate values based on multiple data streams received can be determined for each time interval. This is performed by further aggregating data for a particular time interval across multiple data streams. In an embodiment, the quantization of an input data stream is performed at the end of each time interval so that the quantized data for the time interval is available for processing.

Furthermore, the instrumentation analysis system 100 stores the quantized data for individual data streams so that data across multiple data streams can be combined in various ways, for example, as specified in a request. In other words, a user may send a first request that combines data across a plurality of data streams in a first manner. Subsequently the user may send a new request for combining the data across different data streams in a different manner. For example, a user may combine data across data streams to view aggregates computed over various data centers. However, subsequently the user may change the request to view aggregates computed over different types of applications, different types of servers, different geographical regions, and so on.

The instrumentation analysis system 100 may also receive a request in which the user modifies the set of data streams over which previous data streams were aggregated. For example, the user may request the instrumentation analysis system 100 to remove one or more data streams from the set of data streams being aggregated and request an aggregate based on the revised set. A user may send such a request to analyze the impact of removing or adding a new server, application, or making any other modification to the system configuration. The instrumentation analysis system 100 keeps the quantized data stream's data and combines the quantized data streams data for different time intervals based on these requests. Since the instrumentation analysis system 100 stores the quantized data streams data, the instrumentation analysis system 100 has the ability to efficiently combine data across data streams as needed.

The instrumentation analysis system 100 can combine data across data streams to perform moving aggregate calculations across multiple data streams. The instrumentation analysis system 100 may continuously compute any moving aggregate value across a given length of time interval, for example, one hour moving average, a 15 minute moving average, and so on.

The quantization module 240 aggregates the values of the input data streams for each time interval and generates an aggregate value for the time interval. Accordingly, the quantization module 240 receives a data stream in which data values can occur after arbitrary time intervals. The quantization module 240 processes the input data stream to generate a data stream in which the data is available at regular time intervals. The details of the quantization module 240 are further described herein.

The quantization module 240 receives information describing the type of value received in the data streams, for example, whether the value is a count of certain action or entities, whether the value was obtained by an aggregation of certain value, whether the value represents a maximum/minimum value of a given set of values, and so on. The type of value of the data stream describes the types of operations performed to obtain the value. The quantization module 240 stores a mapping from the various types of values of the data stream to the type of operation performed on the input values of the data stream for an interval to obtain the result value representing the time interval.

Dynamic Selection of Data Streams for a Data Stream Language Program

A data stream language program allows dynamic selection of data streams as input. The data stream language program may specify a search condition for identifying data streams. In an embodiment, the search condition is an expression based on attributes (or metadata tags) describing data streams. These attributes may be received as part of the data stream or associated with the data stream, for example, as metadata added to the instrumentation analysis system 100 and stored in the metadata store 230. The data streams identified by executing the search condition are provided as input to the subsequent block of the data stream language program.

When performing analytics calculations on numeric time series data, data stream language programs often combine two (or more) different data streams using an expression. For example, a data stream language program may express the calculation of the success ratio given counts of number of successes and failures as follows.

num_successes=data('metric:successes')
    num_failures=data('metric:failures')
    success_ratio=num_succeses/(num_successes+num_failures)

In the above example, the data( ) function returns a data stream that contains several time series that match a search criterion based on a metric name. The calculation of success_ratio requires the num_successes and num_failures data streams to be combined through an arithmetic calculation. If the two input streams contain multiple time series each, we will need to know how to match corresponding time series across the two streams in order to perform the calculation.

There may be a plurality of systems, for example, ten different servers that report the number of success and failure outcomes of requests that they serve. In this case, the num_successes and num_failures streams may contain ten data streams each, and the resulting success_ratio stream is also expected to contain ten data streams corresponding to the success ratio of each server. To accomplish this result, the instrumentation analysis system needs to identify the matching pairs of success and failure time series for each server across the two input streams. The instrumentation analysis system performs the identification of matching time series by examining the metadata of the data streams, i.e., by performing metadata correlation.

The instrumentation analysis system identifies metadata of a data stream that defines the identity of a time series through a unique combination of dimensions similar to a primary key, where each dimension consists of a name and value. For example, the metadata of a time series in the num_successes stream might consist of four dimensions: {action:get, type:user, host:srv1, metric:successes}. Similarly, the metadata of a time series in the num_failures stream might look like: {action:get, type:user, host:srv1, metric:failures} Since the combination is unique, by definition, no other data stream shares the same combination of dimensions. However, it is possible for other data streams to be identified by a subset or a superset of these dimensions, such as: {action:get, type:user, metric:successes} {action:get, type:user, host:srv1, metric:successes, service:login}.

Processes for Correlating Data Streams

Embodiments of the invention correlate metadata of data streams across multiple data streams for combination. Combination of sets of data streams is complicated for several reasons. A data stream language expression generates a set of data stream (the terms data stream language expression and data stream language programs are used interchangeably. Data streams within the set may have differing number of dimensions in their metadata. Data streams (with unknown metadata) may dynamically enter or leave the set of data streams. However the semantics of the data stream language program cannot change over time, for example during subsequent executions or during a ling running execution. A data stream language expression E may combine outputs of one or more data stream language sub-expressions (e.g., E1 and E2). A sub-expression refers to another expression. Multiple sub-expressions may be combined using operators in the same statement of a data stream language program, for example. Alternatively, each sub-expression may be evaluated using a separate statement that assigns the resulting set of data streams to a variable such that the expression combines the variables using operators. The correlation between data streams of two sets S1 and S2 returned by sub-expressions E1 and E2 may not always be one-to-one. The data stream language expression E may be such that one data stream from set S1 may match a plurality of data streams from the set S2. Also, each sub-expression may filter a data stream using different sets of dimensions. Furthermore, the expression E may combine an arbitrary number of sub-expressions, each resulting in a set of data streams.

The metadata of data streams in a set of data streams is heterogeneous. Different data streams in the set can have different key structures. For example, the data stream language program expression ('metric:successes') returns a set of data stream such that all data streams in the set have a metric:successes dimension. It is possible for the resulting set of data stream to simultaneously include the following (and possibly other) data streams:

{metric:successes}
{host:srv1, metric:successes}
{type:user, host:srv1, metric:successes}
{action:get, type:user, host:srv1, metric:successes}
{action:get, type:user, host:srv1, service:login, metric:successes}

The processes disclosed herein for evaluating data stream language expressions correctly process such expressions.

Processes disclosed herein for evaluating data stream language expressions correctly process expressions even if data streams dynamically enter and exit sets of data streams obtained by evaluating sub-expressions. In the course of running a long-lived computation specified using a data stream language program, data streams may dynamically enter or exit sets of data streams obtained by evaluating expressions or sub-expressions because new hosts may be added to, or removed from the environment. Embodiments of the invention determine the correlation between sets of data streams independent of the number of data stream in a set of data streams. Furthermore, embodiments do not assume an a priori knowledge of metadata structure of the sets of data streams other than that specified by the expression generating the set of data stream. Accordingly, the meaning (or semantics) of a computation specified by a data stream language program is invariant and the resulting computation does not behave differently due to the addition or removal of data streams. Accordingly, correlations that succeed in matching do not fail to match at a later stage and do not match a different data stream due to the addition/removal of other data streams from a set of data streams.

Some data stream language programs may cause the instrumentation analysis system correlate one time series to several other time series. For example, the following data stream language program determines the fraction of overall failures for each host:

num_failures_per_host=data('metric:failures').sum (by='host')
total_num_failures=num_failures_per_host.sum( )
failure_ratios=num_failures_per_host/total_num_failures In the above exmaple, the num_failures_per_host variable represents a set of data streams obtained by evaluating data('metric:failures').sum(by='host'). The term "data ('metric:failures')" evaluates to a set of data streams such that each data stream of the set has a 'metric:failures' dimension. The term "sum(by='host')" evaluates to a set S1 that contains as many data streams as there are hosts, where each data stream represents a sum of values from individual data streams matching a particular host value. The total_num_failures stream represents the result of the expression "num_failures_per_host.sum( )" which evaluates to a set S2 that contains one data stream such that each value of the data stream represents a global total value over all hosts obtained by adding data values of the individual input data streams. As a result, the correlation of set of data streams S1 corresponding to num_failures_per_host and S2 corresponding to total_num_failures must match each data stream per host from S1 against the single global total time series in S2 (representing a many to one matching).

Embodiments can successfully evaluate more complicated data stream language expressions. The following data stream language program determines the failure ratio for each host grouped by the action dimension:

failures=data('metric:failures')
by_host_action=failures.sum(by=['host', 'action'])
by_action=failures.sum(by='action')
failure_ratios=by_host_action/by_action In the above data stream language program, the two sum aggregations effectively create new data streams with dimensions named "host" and "action" in the by_host_action set of data streams, and "action" in the by_action set of data streams. In contrast with the previous examples where the system could determine very little about the metadata structure of participating data streams, in this example the dimension names (but not the dimension values) are known due to the presence of the aggregations.

Embodiments further process data stream language expressions that filter sets of data streams on dimensions other than metrics. Such filters require the metadata correlation algorithm to adjust accordingly. The following example data stream language program determines the ratio of successful gets versus puts across all objects, hosts, etc. from input data streams.

A=data('metric:successes', filter('action:get'))
B=data('metric:successes', filter('action:put'))
ratio=A/B In contrast, the following example of data stream language expression determines the ratios of two different hosts, across their different actions and objects.

A=data('metric: successes', filter('host: srv1'))
B=data('metric: successes', filter('host: srv2'))
ratio=A/B Finally, users often also filter data streams asymmetrically, which implicitly limits which time series are included in the combined output stream. In the following example, although a filter has only been defined on one stream, the data stream language program compares successes vs failures for the corresponding actions and objects on the srv1 host only.

A=data('metric:successes', filter('host:srv1'))
B=data('metric:failures')
ratio=A/B These examples illustrate how filters applied on data streams play help define how metadata correlation occurs.

Furthermore, a data stream language may combine more than two data streams, and embodiments of the invention process more than two inputs.

Data Stream Language Program Aggregation and Grouping

The instrumentation analysis system models the structure of metadata in details to be able to analyze computations expressed by data stream language programs. If the metadata of a data stream language program specifies an entry such as "metric:successes" and nothing else, the data stream language processor identifies the grouping structure as "split." Data stream language program aggregation calculations such as sum(by=['host', 'action']) create new data streams whose metadata keys are known a priori. For such aggregations, the data stream language processor identifies the grouping structure as "grouped(P)", where P is the set of dimensions (or property names) that are mentioned in the aggregation ("grouped" structure).

A special case of a grouped structure is when the data stream language program specifies an aggregation that is global (such as sum( ), where all data is aggregated into a single value. The data stream language processor identifies such grouping structure as default, which corresponds to the unique grouping structure grouped(Ø) (i.e., grouped on the empty set of properties).

The data stream language processor determines the grouping structure of a set of data streams by statically (at compile time) examining the program text that describes the computation. The process is performed as part of the type analysis of the program, similar to a compiler analysis performed for a statically typed language like Java or C++.

As described above, split and default are single unique group definition values, whereas there can be many grouped definitions, depending on the sets of dimensions (or properties) being aggregated on.

The complete set of split, default and all grouped group definitions of a program define a partially ordered set P=(G,≤), where G is the set of group definitions and ≤ is defined as follows:

default≤grouped(S) for all S
grouped(S)≤split for all S
grouped(S)≤grouped(T) iff S is a subset of T Given the partial ordering, the data stream language processor defines the most specific grouping of a set of group definitions G as the maximum element of the set:

$MSG(G)=x \in G, \forall g \in G: g \leq x$

The data stream language processor may determine that the most specific grouping MSG(G) does not exist if the set includes elements that are not comparable with all the others.

The data stream language processor uses the partial ordering to determine which grouping structures can be mapped into others, and as such, the grouping structure defines which correlations are possible and which are not. For example, the data stream language processor is always able to match any data stream against a default grouped data stream, since every time series can simply be matched against the single value in the default group.

Similarly, the data stream language processor correlates any data stream grouped as grouped(S) against a data set grouped as grouped(T) where T is a subset of S. For example, the data stream language processor correlates a set of data streams aggregated as grouped({'host', 'action'}) against a set of data streams aggregated as grouped({'action'}). This is so because a data stream with metadata {'host': 'srv1', 'action': 'put'} can be correlated against data streams that have metadata such as {'action': 'put'} by simply trimming (i.e., projecting) the metadata as necessary.

The data stream language processors determines that correlation is not possible between streams that have grouping definitions that are not comparable in the partial ordering. For example grouped({'color'}) and grouped({'pet'}) cannot be correlated, but grouped({'color', 'pet'}) can be correlated with grouped({'pet'}). The data stream language processor flags uncorrelateable grouping structures as errors, during static program analysis.

Correlating split data streams is difficult as not much is known about the structure of their time series metadata, and as such the data stream language processor cannot determine whether the correlation is possible or not.

As discussed in the previous section, the data stream language processor may not be able to determine much information about structure of metadata in split data streams, but data stream language processor is able to determine that the data stream metadata have the properties that match any specified filters. If the filters require a specific value such as metric:failures, host:srv1, etc., the data stream language processor determines that all matching time series will have these same matching values. These known dimensions are referred to as fixed dimensions. Any dimensions in data stream metadata that are not fixed dimensions are referred to as variable dimensions.

Figure 6:
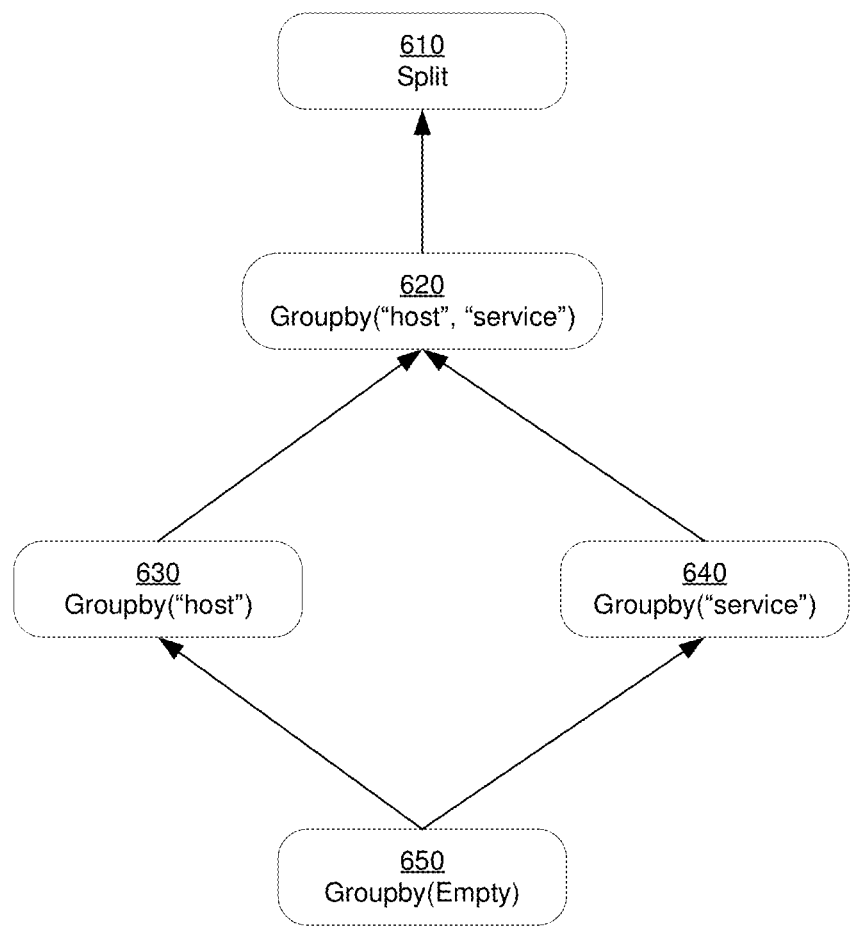
FIG. 6 shows an example structure illustrating comparison of sets of dimensions that may be used for grouping, according to an embodiment.

FIG. 6 shows an example structure illustrating comparison of sets of dimensions that may be used for grouping, according to an embodiment of the invention. The program analysis module 380 may build a data structure to represent the relations between set of dimensions associated with an expression or it may perform the computation on the fly. Each node in the hierarchy represents a grouping structure specifying a set of dimensions. There is an arrow from node 1 to node2 if the set of dimensions represented by node1 is a subset of the set of dimensions represented by node 2. As shown in FIG. 6, the node 650 represents the lowest set of dimensions in the hierarchy is groupby(Empty) since this grouping construct specifies the empty dimension and the empty set is a subset of all other nodes. There is an edge from node 630 to node 620 since set {"host"} corresponding to the grouping construct of node 630 is a subset of set {"host", "service"} corresponding to the grouping construct of node 620. Similarly, there is an edge from node 640 to node 620 since set {"service"} corresponding to the grouping construct of node 640 is a subset of set {"host", "service"} corresponding to the grouping construct of node

620. There is no edge between nodes 630 and 640 since the two sets of dimensions corresponding to the grouping constructs of these nodes do not have a subset/superset relationship. There is an edge from node 620 to node 610 since the set corresponding to the node 610 is the "Split" set that may include al possible dimensions and can be considered a super set of all other sets. There may be other edges originating from node 650 to other nodes (these edges are not shown in FIG. 6). Similarly, there may be other edges terminating at node 610 from other nodes (these edges are not shown in FIG. 6).

If an expression combines results of two sub-expressions corresponding to nodes 620 and 630, the program analysis module 380 determines that the most specific grouping corresponds to node 620. Similarly, if an expression combines results of two sub-expressions corresponding to nodes 620 and 640, the program analysis module 380 determines that the most specific grouping corresponds to node 620. Similarly, if an expression combines results of three sub-expressions corresponding to nodes 640, 620 and 630, the program analysis module 380 determines that the most specific grouping corresponds to node 620. As another example, if an expression combines results of three sub-expressions corresponding to nodes 610, 620 and 630, the program analysis module 380 determines that the most specific grouping corresponds to node 610. These determinations are made by selecting the node highest in the hierarchy shown in FIG. 6 for a given expression comprising a plurality of sub-expressions. If an expression combines results of two sub-expressions corresponding to nodes 630 and 640, the program analysis module 380 determines that there a most specific grouping does not exit and returns error.

In an embodiment, the program analysis module 380 determines the most specific grouping of a set of grouping constructs by comparing the set of dimensions of various grouping constructs and selecting the set of dimension that is a superset of all other dimensions. The program analysis module 380 returns an error if the set of grouping constructs include a set of dimension that is not related to any other set of dimension by a superset or subset relationship.

As with the grouping structure, the data stream language processor determines fixed dimensions of a data stream statically by examining the program text of the computation.

The process of metadata correlation matches metadata dimensions across data streams. The data stream language processor uses fixed dimensions and grouping structure to determine which dimensions of the metadata keys should be considered (or ignored) when correlating time series. The data stream language processor derives this information statically (i.e., by examining the program text that describes the computation)

Figure 7:
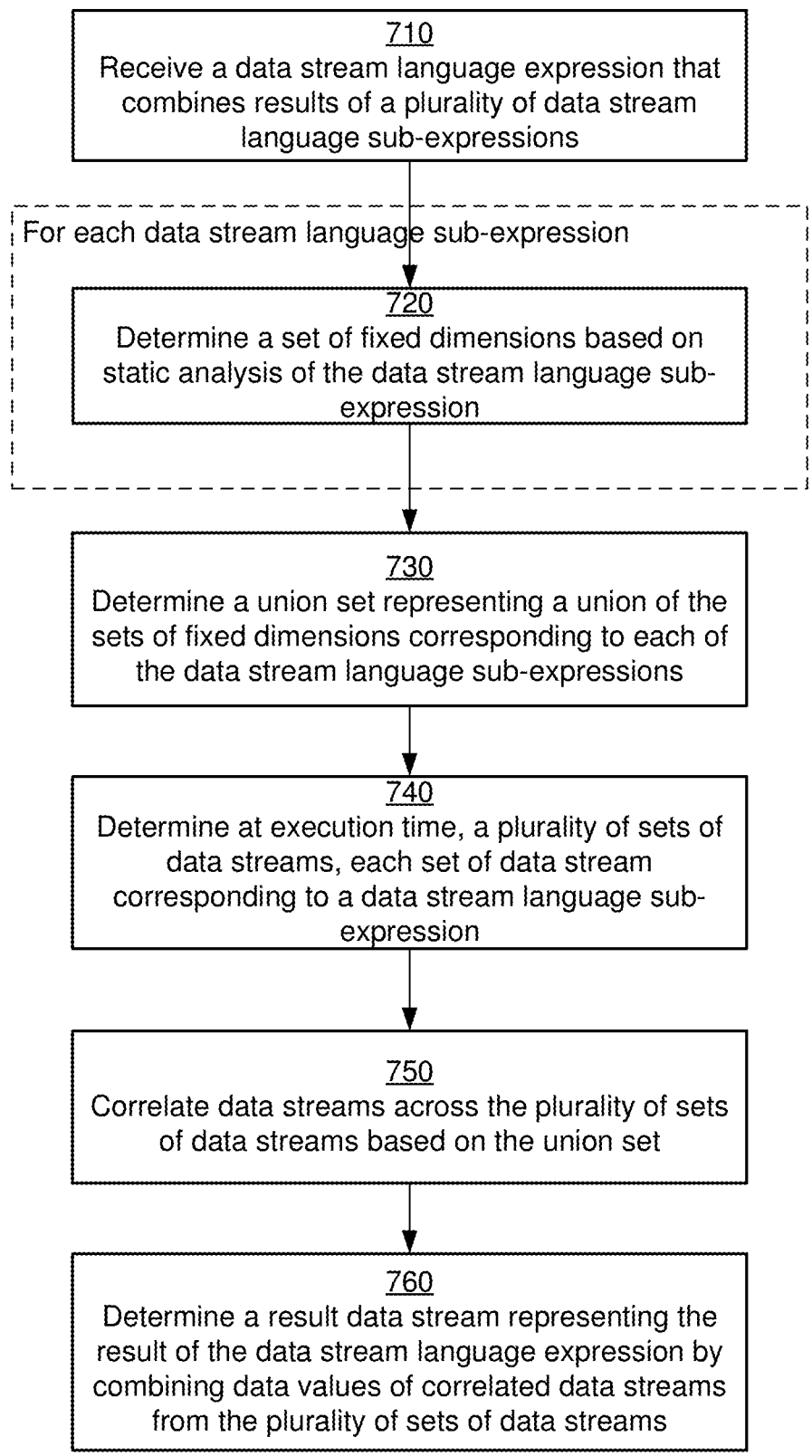
FIG. 7 shows a flowchart illustrating the process of execution of a data stream language program (DSLP) that combines sets of data streams, according to an embodiment.

FIG. 7 shows a flowchart illustrating the process of execution of a data stream language program (DSLP) that combines sets of data streams according to an embodiment of the invention. The data stream language processor receives 710 a DSLP expression that combines result of a plurality of DSLP sub-expressions. In some embodiments the expression may combine the sub-expressions using operators. For example the subexpressions exp1 and exp2 can be combined to obtain an expression (exp1 OP exp2) where OP is an operator, for example, SUM operator. In other embodiments, the result of evaluation of each sub-expression may be assigned to a variable and the expression represented using the variables. For example, two statements v1=exp1 and v2=exp2 assign the results of expressions exp1 and exp2 to variables v1 and v2 respectively and the expression v1 OP v2 combines the variables using an operator. Each expression evaluates to a set of data streams.

The data stream language program performs the step 720 for each sub-expression. The program analysis module 380 determines 720 a set of fixed dimensions based on static analysis of each DSLP sub-expression. The sub-expression may specify dimensions belonging to the set of dimensions, for example, using an expression such as grouped({'host', 'action'}) that specifies the dimensions 'host' and 'action'. Alternatively, the sub-expression may be further built by composing other sub-expressions. In that case, the program analysis module 380 recursively processes each sub-expression to determine the set of dimensions for the sub-expression. The recursion stops when the program analysis module 380 reaches an expression that specifies a set of dimensions, for example, using an expression such as grouped({'host', 'action'}).

The program analysis module 380 determines 730 a union set representing a union of the sets of fixed dimensions corresponding to each of the DSLP sub-expressions. For example, if the expression exp is composed of two sub-expressions exp1 and exp2 and the set of dimensions S1 corresponding to exp1 is determined to be {d1, d2, d3} and the set of dimensions S2 corresponding to exp2 is determined to be {d1, d3, d4}, the union set of fixed dimensions is S1 U S2 (i.e., union of S1 and S2) and is represented as {d1, d2, d3, d4}.

At execution time, the instrumentation analysis system receives data streams from several systems and processes them to determine a set of data streams corresponding to evaluation of the expression. The runtime execution module 390 of the data stream language processor determines 750, a plurality of sets of data streams, each set of data stream obtained by evaluating a DSLP sub-expression. The runtime execution module 390 correlates 750 data streams across the plurality of sets of data streams based on the union set. The details of the correlation step 750 are provided in connection with FIG. 8. The runtime execution module 390 determines 760 a result data stream representing the result of the DSLP expression by combining data values of correlated data streams from the plurality of sets of data streams, the combination evaluating the expression for each set of data values and providing the result as a data value of the result data stream.

Figure 8:
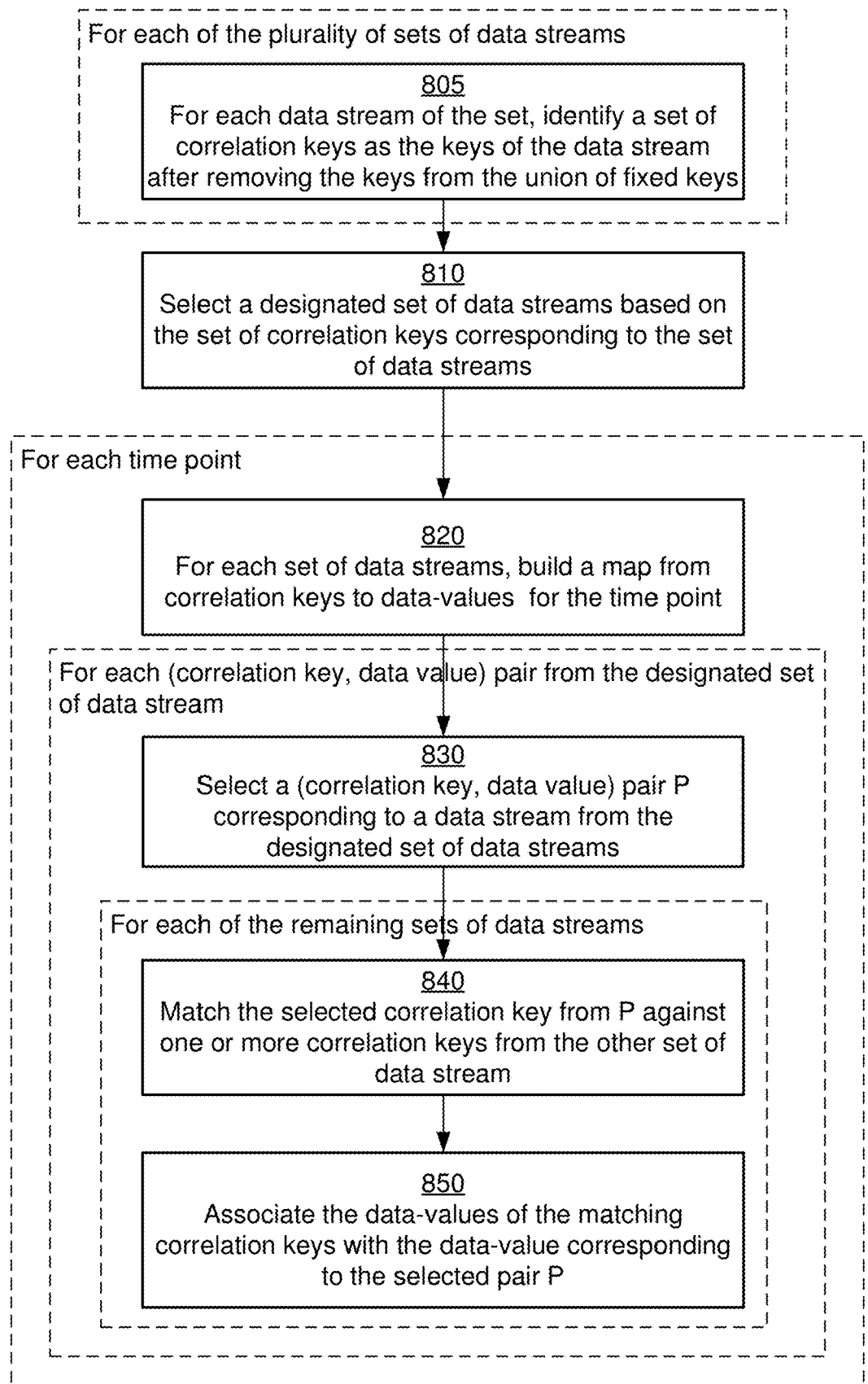
FIG. 8 shows a flowchart illustrating the process of correlation of sets of data streams, according to an embodiment.

FIG. 8 shows a flowchart illustrating the process of correlation of sets of data streams according to an embodiment of the invention. For each of the plurality of sets of data streams (each corresponding to a sub-expression), the runtime execution module 390 performs the step 805. Accordingly, for each data stream of the set, the runtime execution module 390 identifies 805 a set of correlation keys as the keys of the data stream that remain after removing the keys of the union of fixed keys.

The runtime execution module 390 selects 810 a designated set of data streams from the plurality of sets of data streams based on the set of correlation keys corresponding to the set of data streams. In an embodiment, the runtime execution module 390 selects the set of data streams corresponding to the sub-expression with the set of dimensions (representing the correlation keys) having the most specific grouping based on a partial order between sets of dimensions as illustrated in FIG. 6. Each set of dimensions in this scenario corresponds to correlation keys corresponding to a set of data streams (that corresponds to a sub-expression). The runtime execution module 390 uses the selected set of data streams as the designated set of data streams.

The runtime execution module 390 performs the following steps (820, 830, 840, and 850) for each time point for which the expression needs to be evaluated.

For each set of data streams, the runtime execution module 390 builds 820 a map from correlation keys to data-values for the time point. Each entry of the map corresponds to a data stream from the set of data streams.

The runtime execution module 390 repeats the steps 830, 840, and 850 for each (correlation key, data value) pair from the designated set of data stream. The runtime execution module 390 selects 830 a (correlation key, data value) pair P corresponding to a data stream from the designated set of data streams.

The runtime execution module 390 repeats the steps 840, and 850 for each remaining sets of data streams (other than the designated set of data streams). The runtime execution module 390 matches the selected correlation key (identified as correlation key Kx) from pair P against one or more correlation keys (identified as correlation key Ky) from the other set of data stream. The matching between the correlation keys Kx and Ky may be exact matching where the two sets of keys are identical. In some embodiments, multiple correlation keys Kx match the same correlation key Ky. This is so because the set of dimensions corresponding to the correlations keys Ky is a subset of the set of dimensions corresponding to the correlation key Kx.

In an embodiment the runtime execution module 390 builds a data structure that maps values of correlation keys to data values of the data stream for each set of data stream, for example, a hash table or a hash map. The data structure is used for looking up data values corresponding to specific correlation key values. For example, the correlating keys may represent the set for a single dimension {"hostname"}. A set of data streams may include three data streams, one with "hostname=h1", another one with "hostname=h2", and a third one with "hostname=h3". The hash table (or another data structure) may map the key values to data values at a particular time. Accordingly key value "h1" may map to data value v1, key value "h2" may map to data value v2, and key value "h3" may map to data value v3, where v1, v2, and v3 represent data values of the corresponding data streams at a particular point in time.

If the runtime execution module 390 is unable to find any data stream that matches a correlation key of the designated set of data streams, the runtime execution module 390 drops the correlation key and does not generate a data stream corresponding to that correlation key.

The runtime execution module 390 associates 850 the data-values of the matching correlation keys with the data-value corresponding to the selected pair P. The associated data values are used for performing the computation corresponding to the expression being evaluated. The result of evaluation of the expression is provided as a data value of the result of the expression. The result can be multiple values if the expression evaluates to a set of data streams.

In an embodiment, the correlation keys of the designated set of data streams is used as the metadata describing the result set of data streams.

User Interface for Generating Reports Using Data Stream Language Programs

In some embodiments, the instrumentation analysis system 100 provides a user interface that generates data stream language programs for the end user interested in viewing the reports based on data streams. The user is provided with a user friendly user interface that hides the complexity of the data stream language. The user interface provided by the instrumentation analysis system shows various widgets that allow users to take actions such as select the metrics for generating reports, performing rollups, grouping data streams and so on.

Figure 9:
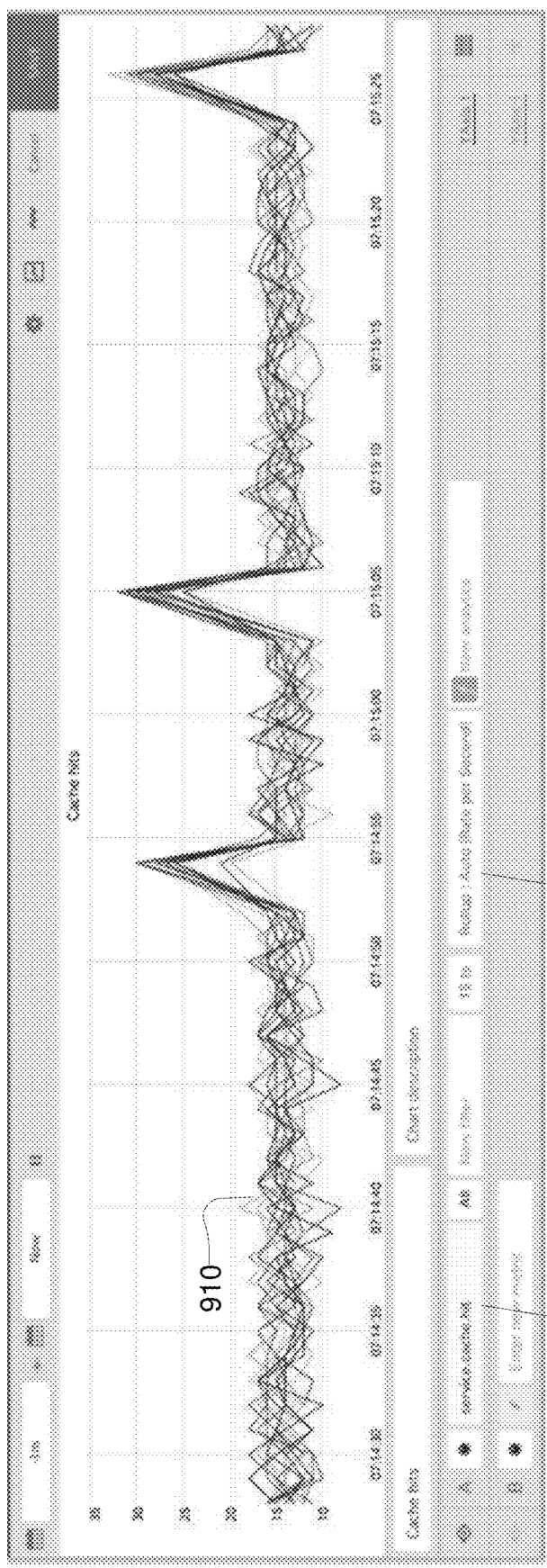
FIG. 9 shows a screenshot of a user interface displaying result of execution of a data stream language program that shows data streams received by the instrumentation analysis system, according to an embodiment.

FIG. 9 shows a screenshot of a user interface displaying result of execution of a data stream language program that shows data streams received by the instrumentation analysis system, according to an embodiment. The screenshot shows several charts 920 displaying data streams representing metric 920 service.cache.hits. The metric represents cache hit values received from instrumented software executing on development systems 120. The values are rolled up to a time interval of 1 second. Accordingly, the cache hits values received in each time interval of one second are added together. There can be a large number of services reporting the metric service.cache.hits and accordingly a large number of charts 920 is displayed. FIG. 9 shows various widgets that allow a user to take actions, for example, select the metric that is reported by the user interface, perform rollups.

Figure 10:
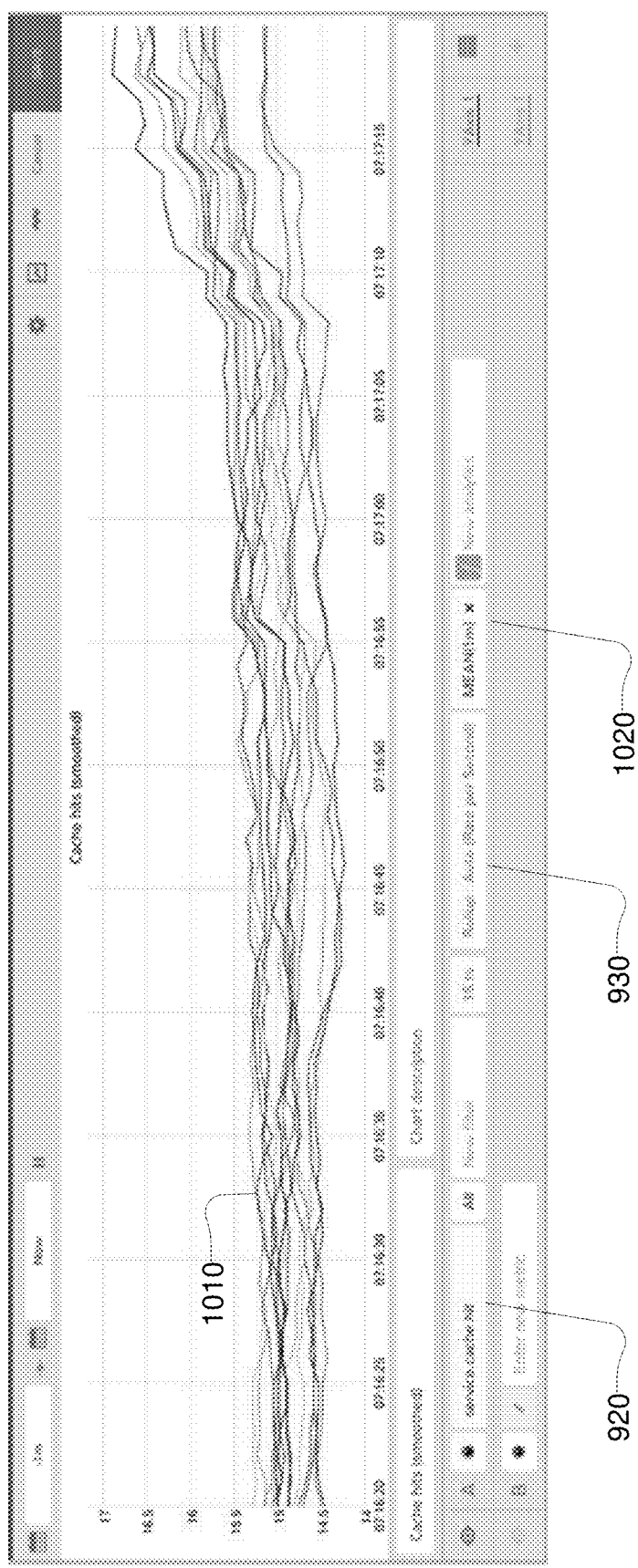
FIG. 10 shows a screenshot of a user interface displaying result of execution of a data stream language program showing 1 minute average of data of data streams received by the instrumentation analysis system, according to an embodiment.

FIG. 10 shows a screenshot of a user interface displaying result of execution of a data stream language program showing 1 minute average of data of data streams received by the instrumentation analysis system, according to an embodiment. FIG. 10 shows a widget that allows a user to specify certain computations to be performed on the data streams. Specifically, FIG. 10 shows a widget 1020 that computes a one minute mean for each data stream. As a result the charts 1010 are smoother than the charts shown in FIG. 9. However the number of charts 1010 shown in FIG. 10 is same as the number of charts 910 shown in FIG. 9.

Large enterprises may have a very large number of development systems 120. Each development system may execute multiple services, each service reporting the metrics. As a result, the number of charts displayed in FIGS. 9 and 10 can be very large. A user can gain better insight into the data reported by data streams by grouping the data streams as shown in FIG. 11.

Figure 11:
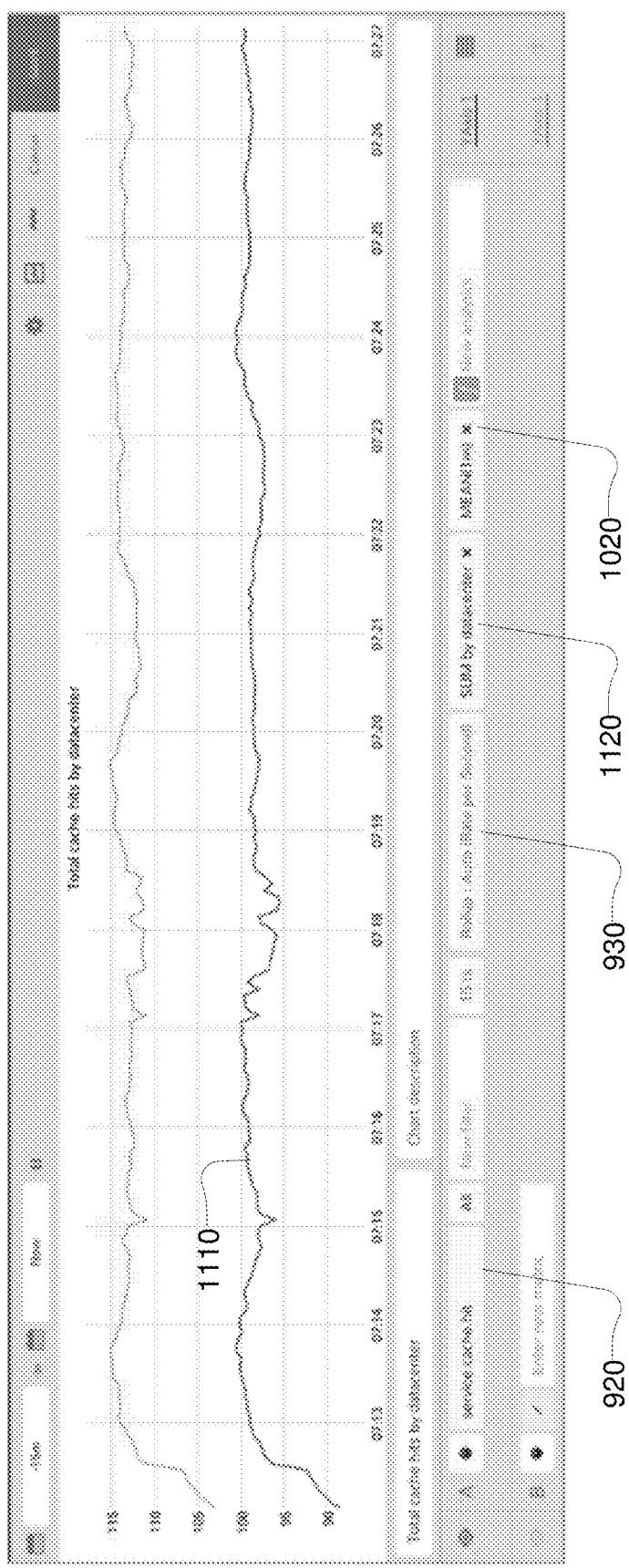
FIG. 11 shows a screenshot of a user interface displaying result of execution of a data stream language program showing sum of data streams grouped by data center, according to an embodiment.

FIG. 11 shows a screenshot of a user interface displaying result of execution of a data stream language program showing sum of data streams grouped by data center, according to an embodiment. FIG. 11 shows widget 1120 that allows specification of attribute by which the data streams are grouped and the aggregation operation performed for each group. As shown in FIG. 11, the user has requested grouping by data center and performing the sum operation for each group. Assuming there are only two data centers, the number of charts is reduced to two. Each chart 1110 shows the sum of data values of data streams received from a particular data center.

Figure 12:
FIG. 12 shows a screenshot of a user interface displaying result of execution of a data stream language program including a customized macro block that determines ratio of cache hit rate and sum of cache hit rate and miss rate for data streams grouped by datacenters, according to an embodiment.

FIG. 12 shows a screenshot of a user interface displaying result of execution of a data stream language program including a customized macro block that determines ratio of cache hit rate and sum of cache hit rate and miss rate, for data streams grouped by datacenters, according to an embodiment. As shown in FIG. 12, a user refers to data streams reporting metric service.cache.hit using the widget 1230 as A. The user further refers to data streams reporting the metric service.cache.miss using the widget 1240 as B. The user defines the computation A/(A+B) as the ratio of the cache hit with respect to the sum of cache hits and cache misses. The user further specifies using widget 1250 that the value A/(A+B) computed should be scaled by a multiple of 100. This computation is performed for each group of data streams based on datacenter. Accordingly, a chart 1210 is generated for each data center reporting real time values of cache hit ratio for all data streams received from the data center.

Alternative Embodiments

It is to be understood that the Figures and descriptions of the present invention have been simplified to illustrate elements that are relevant for a clear understanding of the invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for evaluating expressions and processing data streams, the method comprising:
    receiving a data stream language expression, the data stream language expression configured to combine result data streams from a plurality of data stream language sub-expressions;
    for each of the plurality of data stream language sub-expressions, determining a set of fixed dimensions based on static analysis of a data stream language sub-expression, the set of fixed dimensions representing keys for uniquely identifying data streams obtained by processing the data stream language sub-expression;
    determining a union set representing a union of the sets of fixed dimensions corresponding to the plurality of data stream language sub-expressions;
    determining, at execution time of the data stream language expression, a plurality of sets of data streams, each set of data streams corresponding to a data stream language sub-expression from the plurality of data stream language sub-expressions;
    correlating data streams across the plurality of sets of data streams based on the union set;
    for each set of data streams from the plurality of sets of data streams:
        determining a set of correlation keys for a data stream, wherein the set of correlation keys represents dimensions uniquely identifying the set of data streams excluding dimensions belonging to the union set for each data stream of the set;
    correlating data streams across the plurality of sets of data streams by associating data streams from each set of data streams that have matching correlating keys; and
    determining one or more result data streams for the data stream language expression, wherein each data value of a result data stream is obtained by combining data values of correlated data streams from the plurality of sets of data streams.

2. The method of claim 1, wherein correlating the data streams across the plurality of sets of data streams by associating the data streams from each set of data streams that have the matching correlating keys comprises:
    selecting a designated set of data streams from the plurality of sets of data streams; and
    matching data streams from the designated set of data streams with data streams from each remaining set of data streams from the plurality of sets of data streams.

3. The method of claim 2, wherein matching the data streams comprises:
for each data stream from the designated set of data streams:
identifying a data value from the data stream; and
for each remaining set of data stream:
identifying a matching data stream;
identifying a data value from the matching data stream; and
combining all of the identified data values based on the expression.

4. The method of claim 2, wherein the designated set of data streams corresponds to the set of data streams from the plurality of data streams with a most specific grouping of correlating keys.

5. The method of claim 2, wherein a key based on a first set of dimensions corresponding to the designated set of data streams matches a key based on a second set of dimensions if the second set of dimensions is a subset of the first set of dimensions.

6. The method of claim 2, further comprising:
storing correlation keys of the designated set of data streams as metadata for a result set of data streams obtained by evaluation of the data stream language expression.

7. The method of claim 1, further comprising repeatedly evaluating the expression at a predetermined rate that is a multiple of a rate at which data is received for data streams processed as input for the expression.

8. The method of claim 1, wherein the expression combines results of sub-expressions using one of: an arithmetic operator or a boolean operator.

9. The method of claim 1, further comprising:
building, for each set of data streams, a data structure storing a mapping from correlation keys to data-values, wherein identifying a data value from a data stream of the sets of data streams comprises looking up the data value using the map.

10. The method of claim 1, wherein the data streams processed as input for the expression are received from one or more of instrumented software executing on external systems or as a result of execution of a data stream language program.

11. A computer-readable non-transitory storage medium storing instructions that, when executed by a processor, cause the processor to perform steps comprising:
receiving a data stream language expression, the data stream language expression configured to combine result data streams from a plurality of data stream language sub-expressions;
for each of the plurality of data stream language sub-expressions, determining a set of fixed dimensions based on a static analysis of a data stream language sub-expression, the set of fixed dimensions representing keys for uniquely identifying data streams obtained by processing the data stream language sub-expression;
determining a union set representing a union of sets of fixed dimensions corresponding to the plurality of data stream language sub-expressions;
determining, at execution time of the data stream language expression, a plurality of sets of data streams, each set of data streams corresponding to a data stream language sub-expression from the plurality of data stream language sub-expressions;
correlating data streams across the plurality of sets of data streams based on the union set;
for each set of data streams from the plurality of sets of data streams:
determining a set of correlation keys for a data stream, wherein the set of correlation keys represents dimensions uniquely identifying the set of data streams excluding dimensions belonging to the union set for each data stream of the set;
correlating data streams across the plurality of sets of data streams by associating data streams from each set of data streams that have matching correlating keys; and
determining one or more result data streams for the data stream language expression, wherein each data value of a result data stream is obtained by combining data values of correlated data streams from the plurality of sets of data streams.

12. The computer-readable non-transitory storage medium of claim 11, wherein correlating the data streams across the plurality of sets of data streams by associating the data streams from each set of data streams that have the matching correlating keys comprises:
selecting a designated set of data streams from the plurality of sets of data streams; and
matching data streams from the designated set of data streams with data streams from each remaining set of data streams from the plurality of sets of data streams.

13. The computer-readable non-transitory storage medium of claim 12, wherein matching the data streams comprises:
for each data stream from the designated set of data streams:
identifying a data value from the data stream; and
for each remaining set of data streams:
identifying a matching data stream;
identifying a data value from the matching data stream; and
combining all of the identified data values based on the expression.

14. The computer-readable non-transitory storage medium of claim 12, wherein the instructions further cause the processor to perform the steps comprising:
storing correlation keys of the designated set of data streams as metadata for a result set of data streams obtained by evaluation of the data stream language expression.

15. A computer system comprising:
a computer processor; and
a computer-readable non-transitory storage medium storing instructions for:
receiving a data stream language expression, the data stream language expression configured to combine result data streams from a plurality of data stream language sub-expressions;
for each of the plurality of data stream language sub-expressions, determining a set of fixed dimensions based on a static analysis of a data stream language sub-expression, the set of fixed dimensions representing keys for uniquely identifying data streams obtained by processing the data stream language sub-expression;
determining a union set representing a union of the sets of fixed dimensions corresponding to the plurality of data stream language sub-expressions;
determining, at execution time of the data stream language expression, a plurality of sets of data streams, each set of data streams corresponding to a data stream language sub-expression from the plurality of data stream language sub-expressions;

correlating data streams across the plurality of sets of data streams based on the union set;

for each set of data streams from the plurality of sets of data streams:

determining a set of correlation keys for a data stream, wherein the set of correlation keys represents dimensions uniquely identifying the set of data streams excluding dimensions belonging to the union set for each data stream of the set;

correlating data streams across the plurality of sets of data streams by associating data streams from each set of data streams that have matching correlating keys; and determining one or more result data streams for the data stream language expression, wherein each data value of a result data stream is obtained by combining data values of correlated data streams from the plurality of sets of data streams.

16. The computer system of claim 15, wherein correlating the data streams across the plurality of sets of data streams by associating the data streams from each set of data streams that have the matching correlating keys comprises:

selecting a designated set of data streams from the plurality of sets of data streams; and matching data streams from the designated set of data streams with data streams from each remaining set of data streams from the plurality of sets of data streams.

17. The computer system of claim 16, wherein matching the data streams comprises:

for each data stream from the designated set of data streams:

identifying a data value from the data stream; and for each remaining set of data streams:

identifying a matching data stream;

identifying a data value from the matching data stream; and combining all of the identified data values based on the expression.

* * * * *